Nov. 18, 1952  E. K. KARLSSON  2,618,273
STALK FEEDING ROLL
Original Filed Dec. 13, 1946  2 SHEETS—SHEET 2
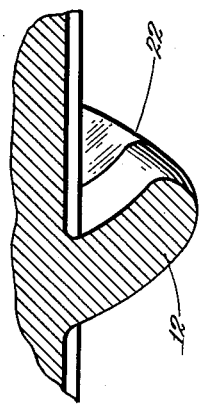
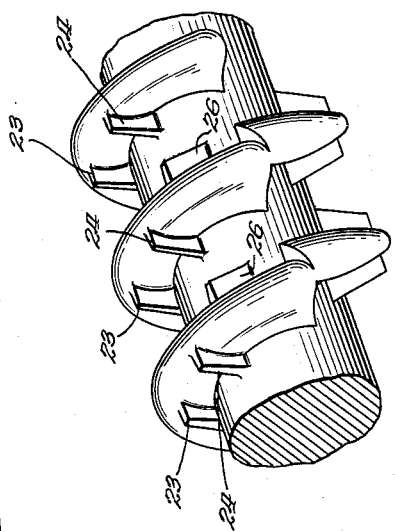
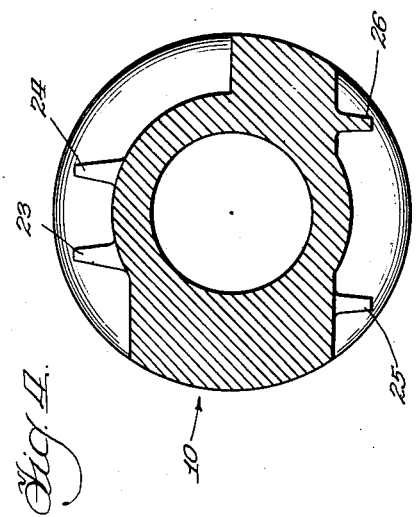
Inventor:
Elof K. Karlsson
Paul O. Pippel
Atty.

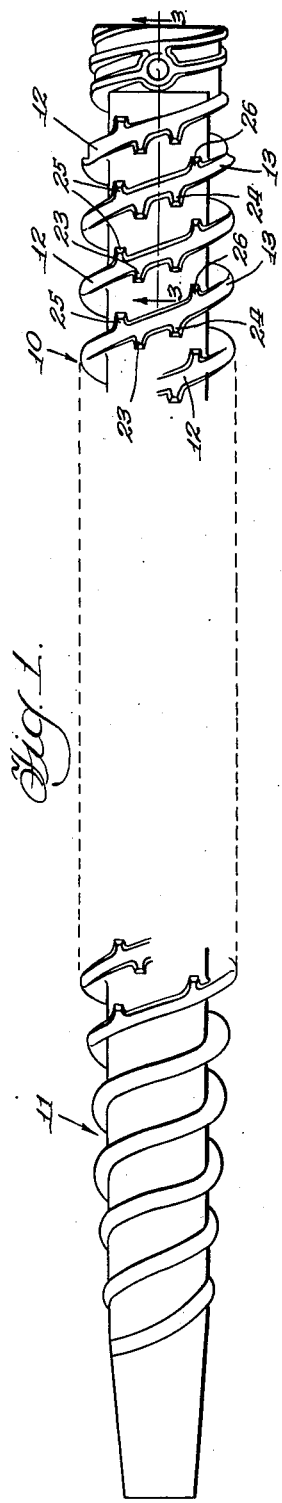
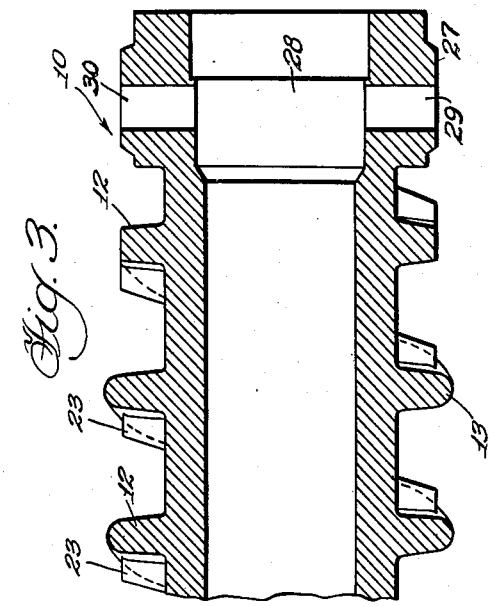
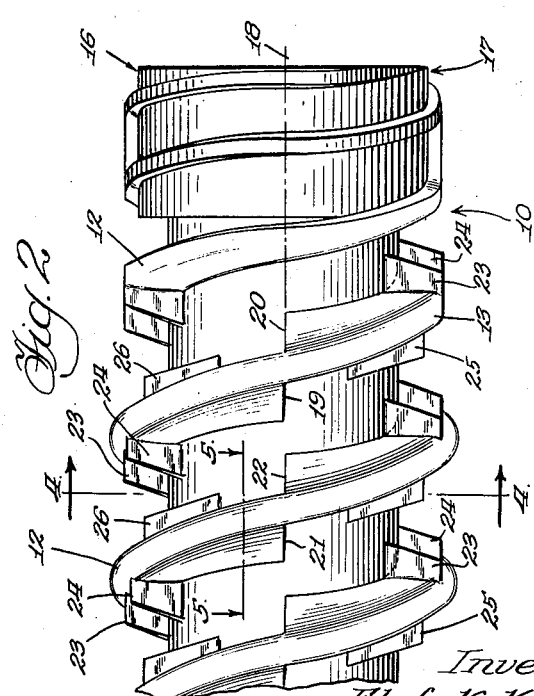

Patented Nov. 18, 1952

2,618,273

UNITED STATES PATENT OFFICE 2,618,273

STALK FEEDING ROLL

Elof K. Karlsson, Moline, Ill., assignor to International Harvester Company, a corporation of New Jersey Original application December 13, 1946, Serial No. 716,149. Divided and this application July 13, 1949, Serial No. 104,430

2 Claims. (Cl. 130—5)

This invention relates to a new and improved stalk feeding roll. This application is a division of my pending application filed December 13, 1946 and having Serial No. 716,149, now abandoned.

One of the principal objects of this invention is the provision of means for moving a stalk lengthwise of the roll and simultaneously moving the stalk downwardly past the roll.

An important object of this invention is to provide a pair of identical cooperative snapping rolls which act to continuously elevate corn stalks or other similar grain lengthwise of the roll and at the same time provide means for aggressively pulling the stalks downwardly through the pair of rolls.

Another important object of this invention is to provide a snapping roll having a continuous helicoidal rib throughout the length of the roll.

A further object of this invention is to provide a snapping roll with a double helicoidal rib continuous throughout the length of the snapping roll.

A still further object of this invention is the provision of a snapping roll having a helicoidal rib continuous at its apex throughout the length of the roll and having offset portions at certain points at the base of the helicoidal rib to provide for aggressive feeding of corn stalks through a pair of adjacent rolls.

Another and still further object of this invention is to provide a stalk feeding roll having a helicoidal rib with certain portions of the base thereof having oppositely extending lateral projections at similar points in the helicoidal rib along the length of the roll and having additional lug projection members spaced from the lateral projections and combining to produce an aggressive stalk feeding roll.

Other and further important objects of this invention will become apparent from the disclosures in the following specification and accompanying drawings in which:

Fig. 1 is a top plan view of the stalk feeding roll of this invention.

Fig. 2 is an enlarged side elevational view of a portion of the roll as shown in Fig. 1.

Fig. 3 is a sectional view taken on the line 3—3 of Fig. 1.

Fig. 4 is a sectional view taken on the line 4—4 of Fig. 2.

Fig. 5 is a sectional view taken on the line 5—5 of Fig. 2.

Fig. 6 is a perspective view showing a surface detail of the roll having the helical rib offset on the diametral plane.

As shown in the drawings, the reference number 10 indicates generally a stalk feeding roll such as a snapping roll used on corn pickers and harvesters. The roll 10 is equipped with the forwardly extending tapering portion 11. Stalk feeding rolls such as 10 are always used in pairs and in corn picking machines the forwardly tapering ends 11 are positioned at the forward end of the machine in such a manner that the rolls will receive between them corn stalks as the machine progresses forwardly along the row of standing corn. The snapping rolls as a rule incline forwardly and downwardly toward the front of the machine. It is the function of a pair of adjacent snapping rolls to transport the stalks rearwardly in the corn picking machine and simultaneously to cause the stalks to be pulled downwardly between the rolls so that ears of corn on the stalk may be snapped therefrom as the stalk is being pulled through the rolls. In the present case, a double helix in the form of ribs 12 and 13 which are placed 180° apart run continuously along the length of the roll 10. As shown in Figures 1 and 2, the ribs 12 and 13 form smooth unbroken helicoidal surfaces throughout the apex or outer peripheral top surface of the rib.

The roll 10 has a semi-circular upper portion 16, and a complementary semi-circular lower portion 17 separated by a diametral plane 18. In the present device the helicoidal ribs 12 and 13 are provided with oppositely extending lateral projections 19 and 20, and 21 and 22 respectively above and below the diametral plane 18 and extending from a position beneath the top surface of the rib to the base thereof. These projections or filled in portions 19, 20, 21, and 22 are added to the sides of the ribs 12 and 13 in such a manner that all previous "undercuts" associated with helicoidal ribs at the diametral plane 18 are avoided. The lateral projection 19 extends to the left of the rib 12 above the diametral plane 18 and forms a stalk engaging surface between the ribs 12 and 13 adjacent the lateral projection 22 formed on the lower half of the rib 13. Both of the projections 19 and 22 lie between the ribs 12 and 13, as do the lateral projections 20 and 21.

The projections 19, 20, 21, and 22 act to cause aggressive downward feeding of stalks which are placed between a pair of adjacent rolls. In addition to the projections 19 to 22, there is need for additional means for positively engaging the stalk between a pair of adjacent rolls. As shown in Figures 1, 2 and 4, closely spaced vertical projections 23 and 24 are provided on one side of the ribs and relatively widely spaced projections 25 and 26 are provided on the ribs on the other side thereof. All of these lugs or projections 23, 24, 25 and 26 are positioned at right angles to the diametral plane 18. The spaced lugs 23 to 26 inclusively are positioned on both the top and bottom of the roll 10 as shown in Figures 2 and 4. These lugs provide sufficient engagement with the stalk intermediate the adjacent rolls to cause the stalks to be pulled downwardly by the rolls. In other words, the lugs bite into the stalk and pull the stalk downwardly through the space between the adjacent rolls.

Lack of all projections extending laterally from the helicoidal ribs 12 and 13 would amount to a roll not sufficiently aggressive to be conducive to good corn snapping and hence the oppositely extending lateral projections 19 to 22 inclusively on the ribs 12 and 13 along the parting plane 18, and also the vertically positioned lugs 23 to 26 inclusively are desirable for obtaining maximum success in the operation of the rolls as feeding and snapping rolls.

The end 27 of the roll 10 opposite the forwardly tapering end is provided with an open end socket portion 28 within which the forward end of a husking roll may be telescoped and a pin may be inserted through diametrically opposed and aligned apertures 29 and 30. The corn husking rolls form no part of the present invention and hence are not shown herein. It should be further understood that the snapping or stalk feeding rolls of this invention will operate entirely independent of other rolls or elements.

Many details of construction may be varied throughout a wide range without departing from the principles disclosed herein and I therefore do not propose limiting the patent granted herein otherwise than as necessitated by the appended claims.

What is claimed is:

1. A corn snapping roll of the type adapted to be used in pairs comprising an elongated roll, a rib fixed to and wound in a spiral path about the outer surface of said roll, the outer peripheral top surface of said rib forming a smooth unbroken helicoid, said roll defined in longitudinally extending halves by a diametral plane extending through the length of the roll, and projecting portions on said spiral rib from a position beneath the top surface to the base thereof extending laterally in one direction on one side of and immediately adjacent the diametral plane and in an opposite direction on the other side of and immediately adjacent the diametral plane.

2. A corn snapping roll as set forth in claim 1 in which auxiliary lugs are disposed alongside the spiral rib at right angles to said diametral plane and in which the lugs project longitudinally of the roll parallel to said diametral plane.

ELOF K. KARLSSON.

REFERENCES CITED

The following references are of record in the file of this patent:

UNITED STATES PATENTS

| Number | Name | Date |
| --- | --- | --- |
| 786,239 | Stone | Mar. 28, 1905 |
| 914,465 | Stone | Mar. 9, 1909 |
| 992,287 | Stone | May 16, 1911 |
| 2,041,139 | Marxman | May 19, 1936 |
| 2,219,483 | Lukes | Oct. 29, 1940 |
| 2,308,102 | Paradise et al. | Jan. 12, 1943 |
| 2,315,950 | Fitzloff | Apr. 6, 1943 |